Patented Jan. 23, 1934

1,944,843

UNITED STATES PATENT OFFICE 1,944,843

CONDENSATION PRODUCTS OF ALPHA-ETHYL HEXENE ALDEHYDE AND PRIMARY AMINES AND PROCESS OF PRODUCING SAME

Harold A. Morton, Akron, Ohio

No Drawing. Application January 17, 1927
Serial No. 161,715

10 Claims. (Cl. 260—130)

My invention or discovery relates to accelerators used in rubber compounds for promoting vulcanization.

The object of the invention is to provide an accelerator which may be manufactured at a relatively low cost and which may be kept in stock without material deterioration for a long period of time, and which, when incorporated in a suitable rubber compound, possesses such activity that proper vulcanization can be accomplished in a relatively brief period of time, and the resultant vulcanized article will exhibit high abrasive resistance, high tensile strength and elasticity, and marked resistance to deterioration, or excellent ageing qualities.

A preferred example of my invention or discovery comprises alpha ethyl hexene aldehyde chemicallly combined with aniline by a process of condensation, into which is subsequently mixed abietic acid for neutralizing this base; the accelerator so formed being mixed according to usual factory practice into a rubber stock comprising rubber, sulphur, or other equivalent vulcanizing agent, and preferably an activator, as zinc oxide.

Alpha ethyl hexene aldehyde is described in Beilstein's Handbuch Der Organischen Chemie, 4th Edition, volume 1, page 744, as alpha ethyl beta propyl acrolein.

Alpha ethyl hexene aldehyde is prepared by treating butyl aldehyde with dilute caustic soda or potash to condense the aldehyde to the corresponding aldol which is then dehydrated by splitting out a molecule of water to yield the unsaturated aldehyde. It is not essential that the aldol be separated as such, as the reaction may be carried out in one step to yield the unsaturated aldehyde directly. It is also possible to condense the aldol directly to the derivative without separating the unsaturated aldehyde.

The unsaturated aldehyde is mixed with a suitable quantity of aniline and the mixture heated to cause the desired chemical reaction, and the water released is then removed, leaving the desired condensation product. The acid in suitable quantity is then thoroughly mixed into this condensation product, the material being suitably heated to convert the acid into a liquid. A suitable product can be produced by a procedure substantially as follows:

To 126 parts by weight of alpha ethyl hexene aldehyde is added 93 parts by weight of aniline, and this mixture, contained in a suitable vessel, is heated to approximately 105° C. for a period of about two hours. The water released is then drawn off and if desired, the condensation product may be further dried by any of the usual methods, as by further moderate heating. Into the resultant product about 90 parts by weight of the acid may be thoroughly incorporated, and, as stated, the condensation product is, during this step, at such a temperature as to melt the acid, if abietic acid, or similar acid, is used, which is a solid at atmospheric temperature. The acid has a neutralizing effect upon the base. The expression "neutralizing" as here used and as employed in some of the appended claims, is intended to cover the action, or reaction, obtained when there is mixed into the condensation product the quantity of acid to effect exact neutralization, as well as a partial neutralization, which would be obtained by the use of an inadequate amount of acid, or an acidic effect, which would be obtained by the use of an excess of acid. The optimum effect is obtained by the use of approximately the exact amount of acid which will effect neutralization, but the use of a somewhat lesser, or greater, amount of acid is within the purview of my invention, or discovery.

The accelerator resulting from carrying out the described procedure may be kept in stock for a long period of time, of the order of two or three years, without material deterioration, and when incorporated in a rubber compound, substantially as in the examples herinafter recited, produces marked beneficial effects, particularly in reference to shortening the time of vulcanization, giving to the vulcanized product high elastic quality and tensile strength, great resistance to abrasion, and excellent ageing qualities.

Without departing from my invention, or discovery, many amino or amine substances may be used in lieu of aniline in the production of the desired condensation product, and without materially affecting the described beneficial qualities thereof. Among such substitutes, the following may be named: ortho toluidine, para toluidine, ethylene diamine, diacetone amine, para amido phenol, ammonia, para tolyl biguanid and phenyl thio urea.

Likewise without departing from my invention or discovery, substitutes for abietic acid may be employed, and as examples of such substitutes, acids as follows may be named: acetic, butyric, carbolic, crotonic and stearic.

The addition to the condensation product of an acid such as described enhances the advantages, or beneficial properties of the described condensation product, but it may be wholly omitted without departing from the scope of my invention or discovery, which comprehends the use as an accelerator in rubber or similar compounds of the described condensation product resulting from the chemical reaction of alpha ethyl hexene aldehyde and an amino or amine substance.

What I claim is:

1. An accelerator of vulcanization consisting of a condensation product of alpha ethyl hexene aldehyde and aniline neutralized by an acid substantially as described.

2. An accelerator of vulcanization consisting of a condensation product of alpha ethyl hexene aldehyde and a primary amine.

3. An accelerator of vulcanization consisting of a primary amine condensation product of alpha ethyl hexene aldehyde reacted with a member of the acetic acid series.

4. An accelerator of vulcanization consisting of a primary amine condensation product of alpha ethyl hexene aldehyde reacted with acetic acid.

5. An accelerator of vulcanization consisting of a condensation product of alpha ethyl hexene aldehyde and aniline.

6. An accelerator of vulcanization consisting of the aniline condensation product of alpha ethyl hexene aldehyde reacted with a member of the acetic acid series.

7. An accelerator of vulcanization consisting of the aniline condensation product of alpha ethyl hexene aldehyde reacted with acetic acid.

8. The process which comprises causing alpha ethyl beta propyl acrolein to react upon a primary aromatic amine.

9. As new products, the compounds of the general formula:

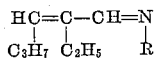

wherein R represents an aromatic nucleus.

10. As a new product, the compound of the formula:

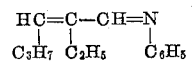

HAROLD A. MORTON.